April 12, 1966     K. NEGORO     3,245,858
APPARATUS FOR SPIN WELDING PLASTIC CLOSURES TO PLASTIC CONTAINERS
Filed March 1, 1963     6 Sheets-Sheet 1
FIG.1
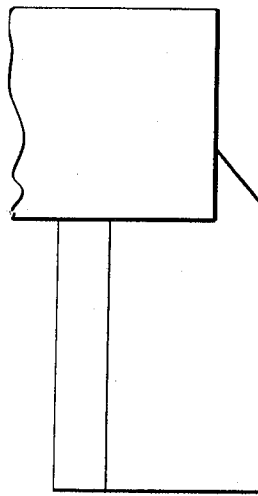
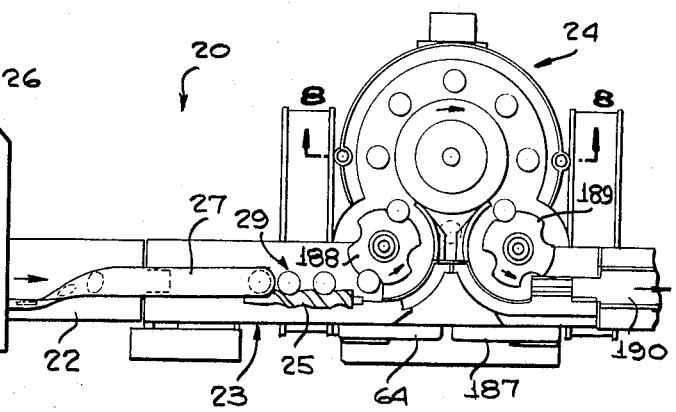
FIG.2
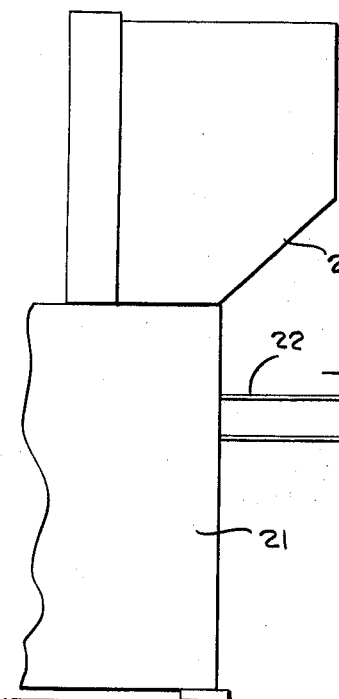
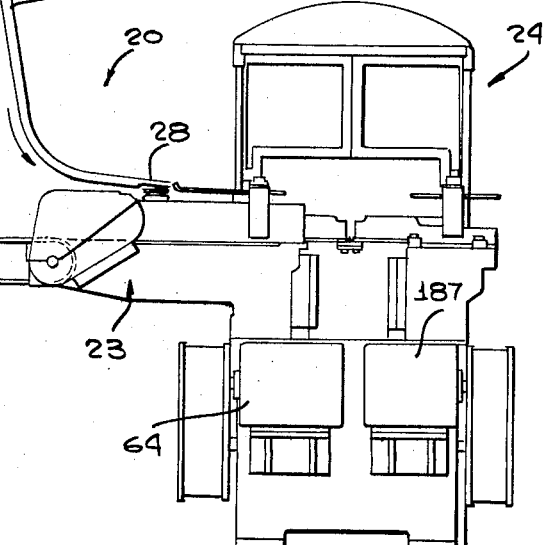
INVENTOR
KAIJI NEGORO
BY Mason, Porter, Diller & Stewart
ATTORNEYS

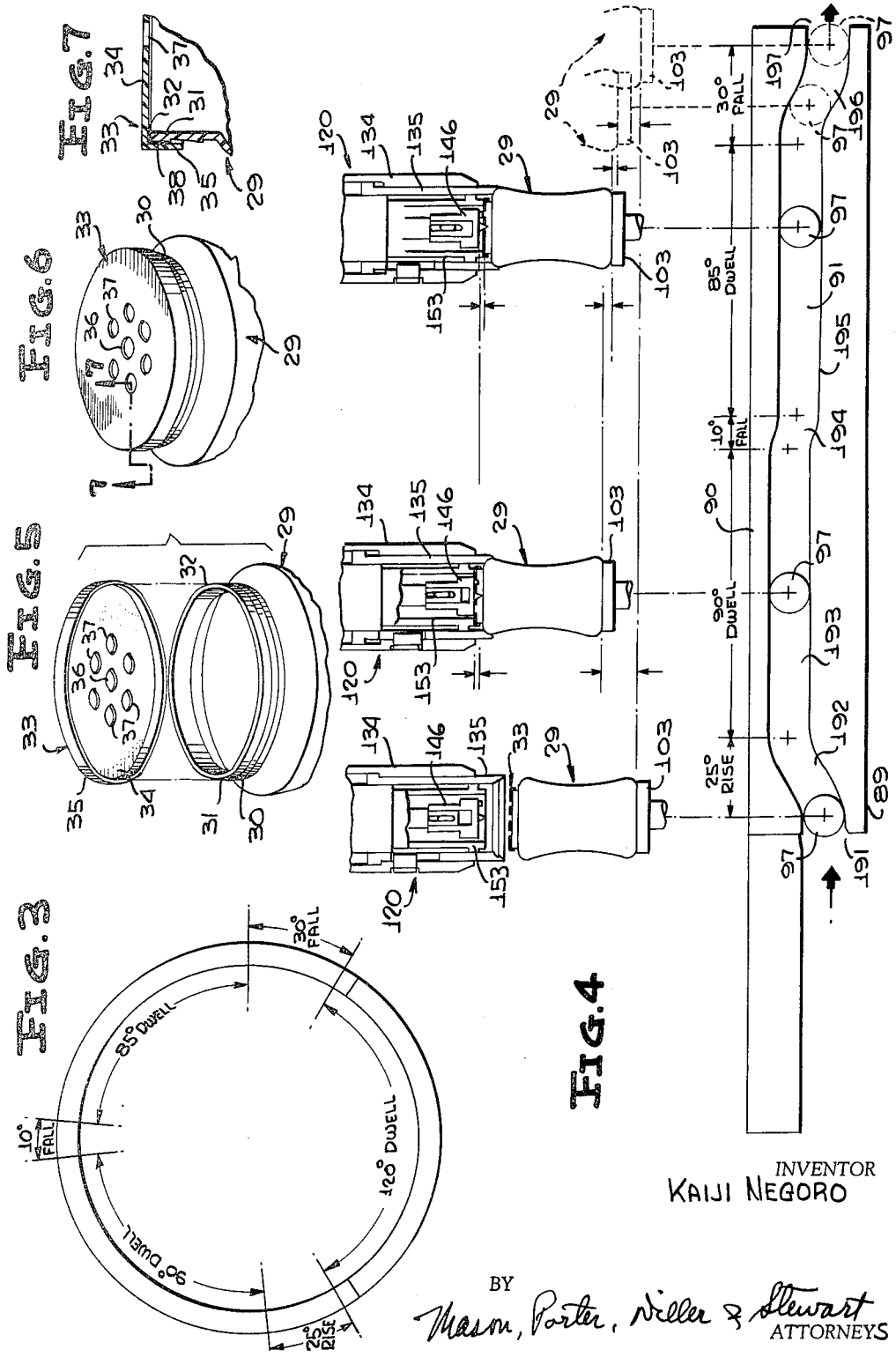

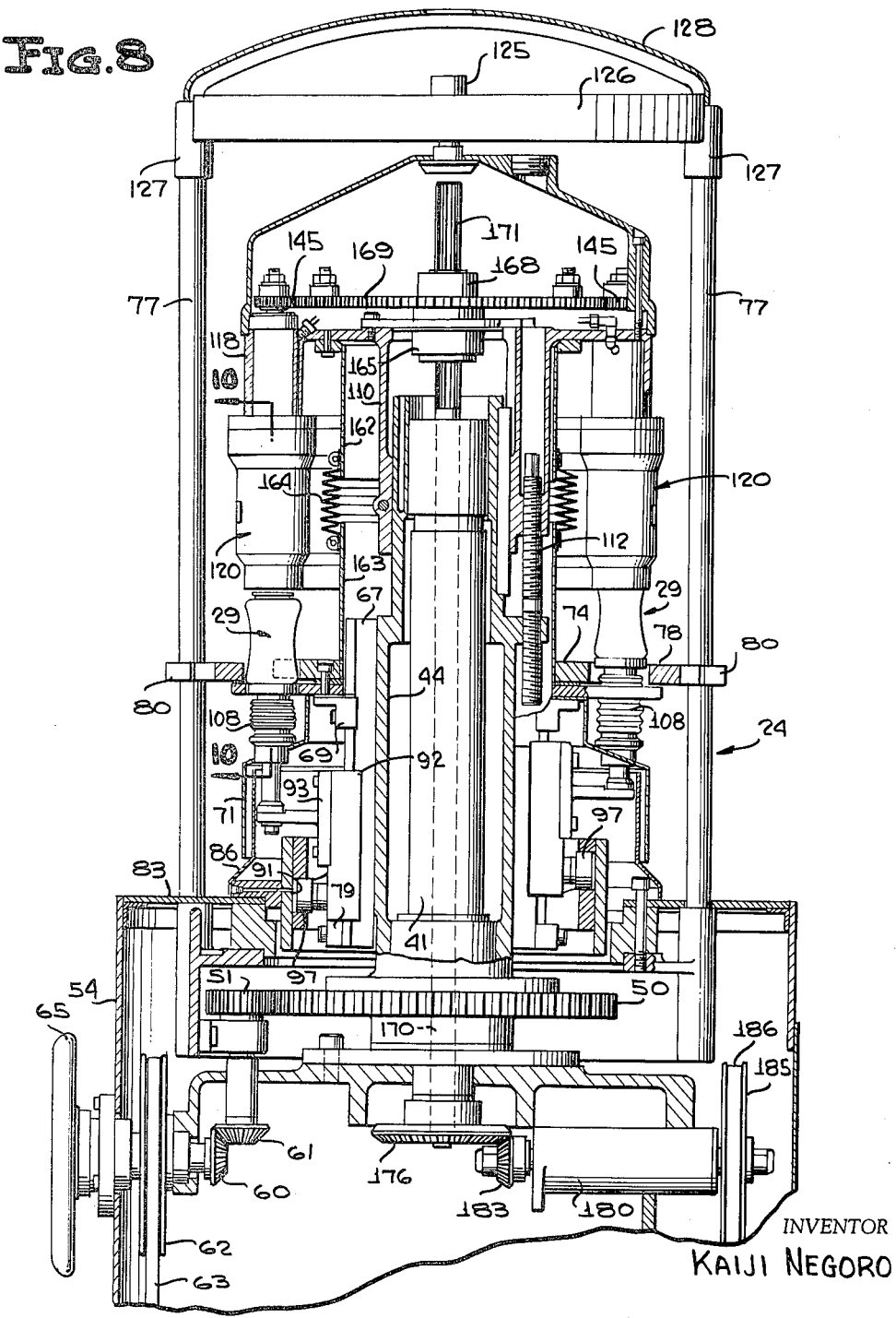

April 12, 1966
K. NEGORO
3,245,858
APPARATUS FOR SPIN WELDING PLASTIC CLOSURES TO PLASTIC CONTAINERS Filed March 1, 1963
6 Sheets-Sheet 4

INVENTOR
KAIJI NEGORO

BY Mason, Porter, Diller & Stewart
ATTORNEYS

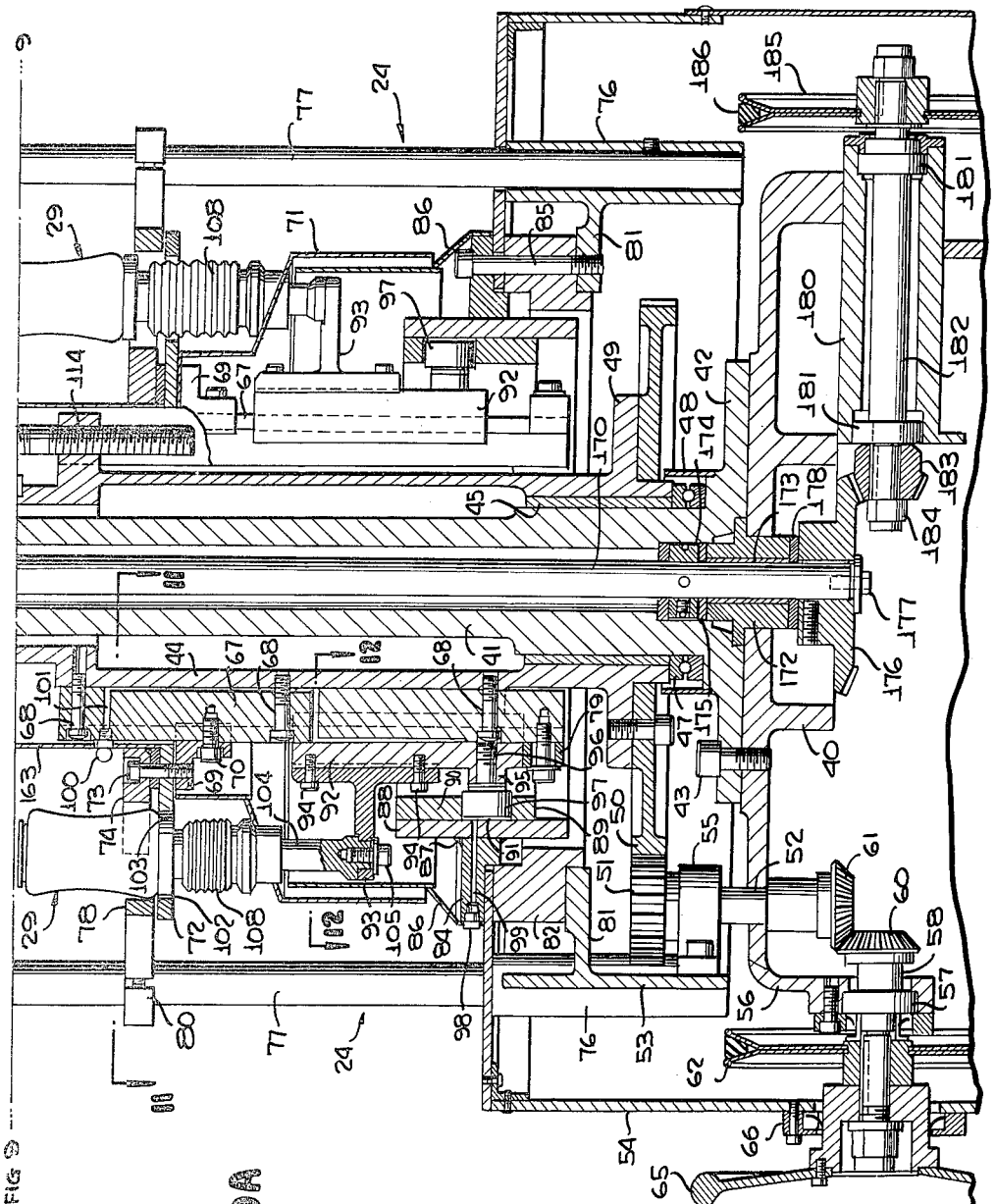

April 12, 1966 K. NEGORO 3,245,858
APPARATUS FOR SPIN WELDING PLASTIC CLOSURES TO
PLASTIC CONTAINERS
Filed March 1, 1963 6 Sheets-Sheet 6
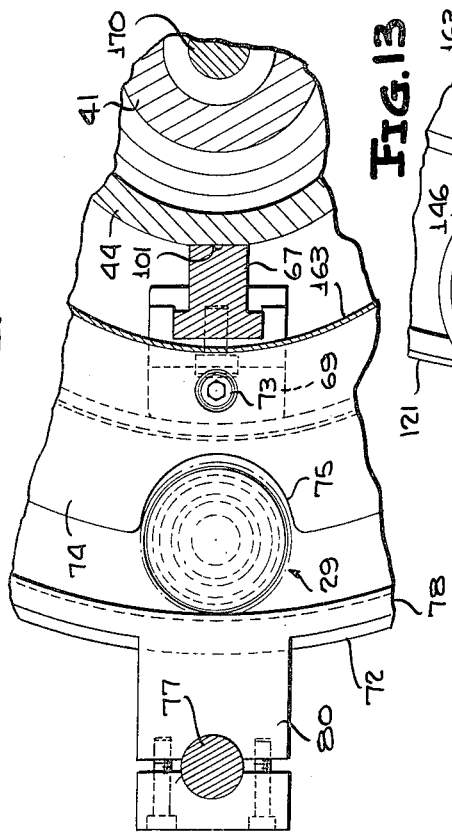
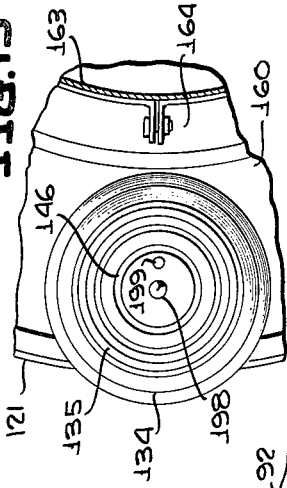
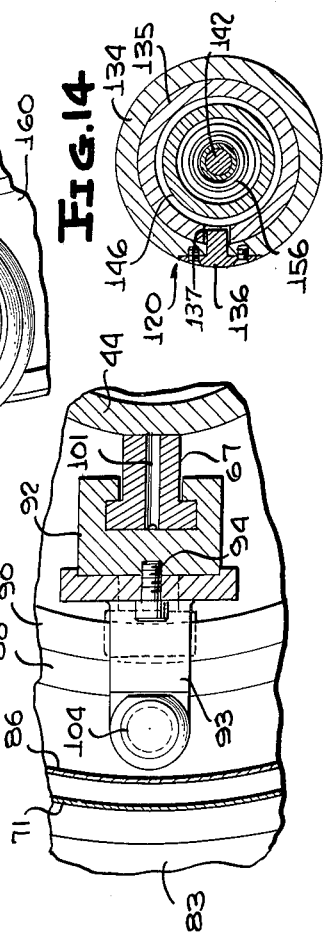
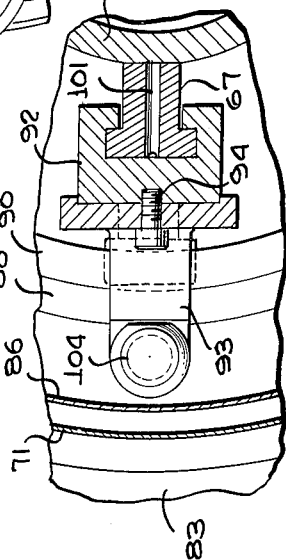
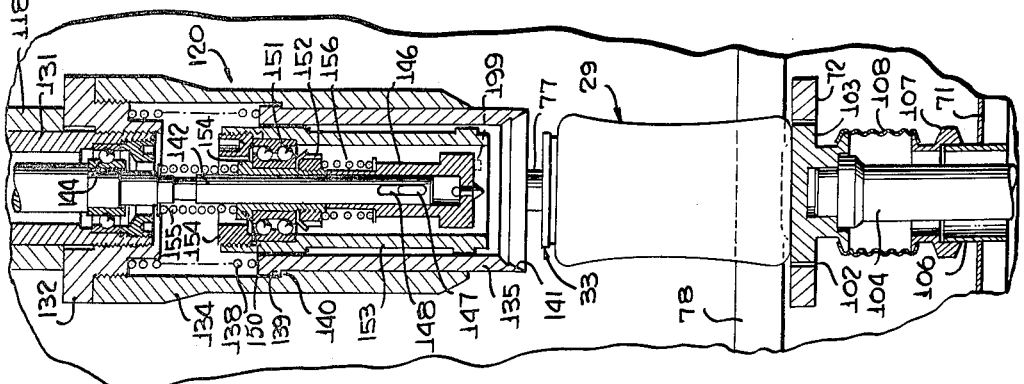
INVENTOR
KAIJI NEGORO
BY Mann, Porter, Niller & Stewart
ATTORNEYS

United States Patent Office 3,245,858
Patented Apr. 12, 1966

3,245,858
APPARATUS FOR SPIN WELDING PLASTIC
CLOSURES TO PLASTIC CONTAINERS
Kaiji Negoro, Clarendon Hills, Ill., assignor to Continental Can Company, Inc., New York, N.Y., a corporation of New York
Filed Mar. 1, 1963, Ser. No. 262,147
21 Claims. (Cl. 156—423)

This invention relates in general to new and useful improvements in the closing of containers, and more particularly relates to a novel apparatus for closing plastic containers by spin welding a plastic closure to a plastic container.

There are many instances were it is necessary to seal a plastic container by the application of a closure thereto. In the past, because of the sealing problems, when it is desired to place an end closure on a plastic container without utilizing threads, the end closure has been formed at least in part of metal and crimped or otherwise deformed to effect the interlocking thereof in sealed relation with the plastic container. Such connections are not only difficult to perform, but are also expensive and therefore undesirable.

Accordingly, it is the primary object of this invention to provide an apparatus which will automatically receive a plastic container having a closure loosely seated thereon, and which will spin the closure while in frictional contact with the container so as to effect a melting of both the closure and the engaged portion of the container and a resultant welding together of the melted plastic to effectively secure the closure to the container in sealed relation relative thereto.

Another object of this invention is to provide a novel apparatus for spin welding plastic closures to containers, the apparatus including a spinning head and a support for the container, the spinning head and support being mounted for relative movement with respect to one another whereby the closure carried by the container is first engaged with a pressure which effectively clamps the closure against the container and then engages the closure with a rotating chuck which effects the spinning of the closure relative to the container while pressure engagement between the closure and the container is maintained by the pressure ring.

Still another object of this invention is to provide a novel apparatus for automatically spin welding plastic closures to containers, the apparatus including a support for a container and a spin welding head with the support and spin welding head being mounted for relative movement towards and away from one another, the spin welding head including a housing which is engageable with an upper portion of the container for simultaneously positioning the container and clamping the same in a fixed position relative to the support, the spin welding head also including a pressure ring for holding the closure in engagement with the container, and a rotating chuck for engaging and spinning or rotating the closure relative to the container while it is held in pressure engagement with the container to effect the melting of the engaged portion of the closure and the resultant welding thereof to the container.

A further object of this invention is to provide an apparatus for applying plastic closures to containers, the apparatus including means for feeding containers, means for loosely positioning plastic closures on the container, and a machine for receiving the assembly of containers and closures and effecting the spinning of the closure relative to the container to melt at least that portion of the closure which is engaged with the container, and effect a weld between the closure and the container.

Still another object of this invention is to provide an apparatus of the turret type which is provided with a plurality of rotating stations and each station includes a support pad for a container and closure assembly and a spin welding head overlying the support pad and being cooperable therewith to clamp the closure and container assembly thereagainst to effect the relative spinning of the closure with respect to the container to provide for the welding of the closure to the container, each support pad and its associated spin welding head continuously rotating about a center of the machine and effecting the spin welding of the closure to the container during such rotation whereby the operation of the machine is continuous.

Another object of this invention is to provide a spin welding head particularly adapted for spinning plastic closures to effect the welding thereof to containers, the spin welding head including a chuck which is constantly driven during the operation of the spin welding head and which chuck includes a center pin and at least one outer pin for engagement in suitable openings in the closure to effect a temporary interlocking of the closure with respect to the chuck whereby the closure is automatically driven by the chuck.

Still another object of this invention is to provide a novel method of spin welding a plastic closure to a container wherein the closure is first presed into engagement with the container, after which the closure is rapidly spun relative to the container while held in pressure engagement therewith to effect the melting of at least the plastic of the closure, and continuing to hold the closure in tight engagement with the container after the spinning of the closure has creased whereby a welding of the closure to the container results.

A further object of this invention is to provide a novel closure and container assembly which includes a container having a cylindrical neck portion and the closure having an end panel and a cylindrical skirt with the skirt being telescoped over the neck portion and initially aligning the closure with the neck portion, and the end panel being seated on and welded to the neck portion uppermost surface.

Still another object of this invention is to provide a novel container and closure assembly in accordance with the foregoing wherein the neck portion of the container has an upper outermost projecting portion which is welded to the skirt of the closure adjacent the closure end panel.

With the above and other objects in view that will hereinafter appear, the nature of the invention will be more clearly understood by reference to the following detailed description, the appended claims and the several views illustrated in the accompanying drawings.

In the drawings:

FIGURE 1 is a plain view of the apparatus of this invention and shows generally the details thereof.

FIGURE 2 is an elevational view of the apparatus of FIGURE 1 and shows further details thereof.

FIGURE 3 is a schematic representation of the cycle of operation of the spin welding apparatus of FIGURES 1 and 2.

FIGURE 4 is a schematic view showing the sequence of movement of a container and closure assembly during a spin welding operation, the view also showing the details of a cam for effecting the raising and lowering of the support pads of the apparatus.

FIGURE 5 is a fragmentary exploded perspective view of the general details of the neck portion of a container and the associated closure prior to the initial positioning of the closure on the container.

FIGURE 6 is a fragmentary perspective view showing the closure welded to the container neck portion.

FIGURE 7 is an enlarged fragmentary vertical sectional view taken along the line 7—7 of FIGURE 6 and shows a specific welded connection between the closure and the container neck portion.

FIGURE 8 is an enlarged vertical sectional view taken through the spin welding apparatus generally along the line 8—8 of FIGURE 1 and shows the specific details of the apparatus of FIGURE 1.

FIGURE 9A is an enlarged vertical sectional view which matches FIGURE 9 and shows in more detail the lower half of the apparatus.

FIGURE 10 is an enlarged fragmentary vertical sectional view taken along the line 10—10 of FIGURE 8 and shows more specifically the details of the spin welding head.

FIGURE 11 is an enlarged fragmentary horizontal sectional view taken generally along the line 11—11 of FIGURE 9A and shows the general details of the means for positioning and supporting a container and closure assembly.

FIGURE 12 is an enlarged fragmentary horizontal sectional view taken generally along the line 12—12 of FIGURE 9A and shows the manner in which the shaft supporting a support pad is mounted for vertical reciprocal movement as the apparatus operates.

FIGURE 13 is an enlarged fragmentary horizontal sectional view taken generally along the line 13—13 of FIGURE 9 and shows one of the spin welding heads as it appears from below.

FIGURE 14 is an enlarged fragmentary transverse horizontal sectional view taken along the line 14—14 of FIGURE 9A and shows the specific mounting of the housing of the spin welding heads in a manner wherein vertical movement thereof is permitted while rotational movement is prevented.

Figure 9:
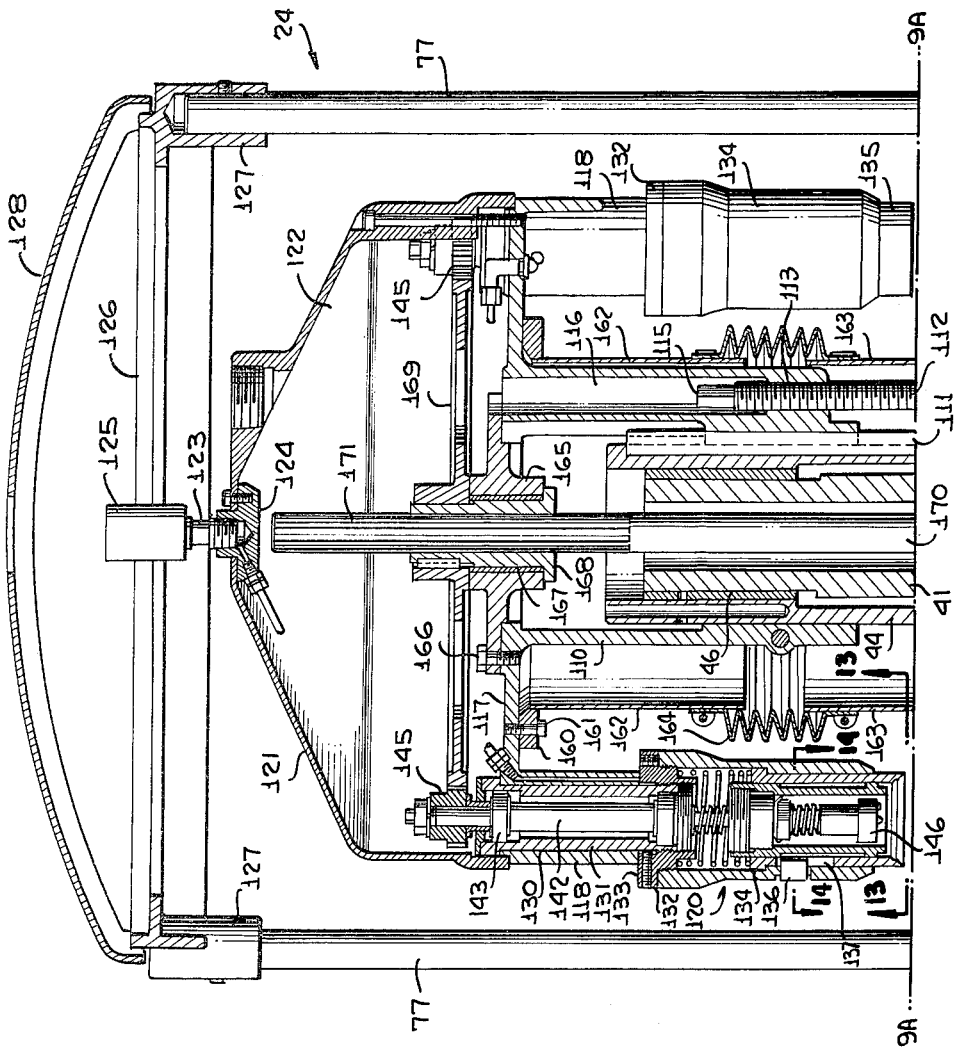
FIGURE 9 is an enlarged fragmentary vertical sectional view similar to FIGURE 8, but on a larger scale and shows only the upper half of the apparatus.

Referring now to the drawings in detail, reference is first made to FIGURES 1 and 2 wherein the over-all details of the apparatus is shown, the apparatus being generally referred to by the numeral 20. The apparatus 20 includes a container feed mechanism 21 which delivers containers to a conveyor 22. The conveyor 22, in turn, transfers the containers to an in-feed conveyor 23 of a spin welding machine, generally referred to by the numeral 24. The in-feed conveyor 23 includes a feed screw 25 (FIGURE 1) which assures the proper spacing of containers to be closed.

The apparatus 20 also includes a closure feed mechanism 26 which includes a closure feed chute 27 which has an exit end 28 overlying the conveyor 23 and being operable to provide closures in timed relation to the position of the containers therebeneath.

Reference is now made to FIGURES 5, 6 and 7, wherein there is illsutrated a container which is to be closed utilizing the apparatus 20, the container being generally referred to by the numeral 29. The container 29 is preferably formed of a plastic material although it is feasible to form it of other materials which will bond to a melted plastic material. The container 29 is provided with a generally cylindrical neck 30 which terminates at its upper end in an outwardly projecting collar 31 and which has an extreme upper surface 32. Except for the construction of the neck 30, the construction of the container 29 is immaterial.

The container 29 has the open upper end thereof closed by a closure, generally referred to by the numeral 33. The closure 33 includes an end panel 34 and a depending skirt 35. The skirt 35 is dimensioned so as to closely engage the collar 31. In order to dispense the contents of the container 29, the closure 33 is provided in the end panel 34 thereof with a central opening 36 and a plurality of outer circumferentially spaced openings 37.

In accordance with this invention, it is proposed to set the closure 33 on the neck 30 of the container 29 and then to weld the closure 33 to the container 29 by rapidly spinning the closure 33 relative to the container 29 with the closure 33 being in frictional contact with at least the extreme upper end surface 32 of the container neck 30 and generally in frictional contact with the outer surface of the collar 31. As a result of this rapid spinning of the closure 33 with respect to the container 29, the surfaces in frictional engagement will become heated and as a result, the plastic material will melt and effect a bond, such as is shown in FIGURE 7 and referred to by the numeral 38. It is to be noted that the bond 38 is illustrated as being between the end panel 34 and the end surface 32 and between the skirt 35 and the collar 31. In some instances, the bond between the skirt 35 and the collar 31 may not be formed or may not be complete due to the differentials in dimensions. However, there will always be a bond between the end surface 32 and the end panel 34.

Referring now to FIGURES 8, 9 and 9A in particular, it will be seen that the spin welding machine 24 includes a base frame 40 which has secured thereto an upstanding tubular shaft 41, the shaft 41 having a lower mounting flange 42 which sits upon the base frame 40 and is suitably secured thereto by means of bolts 43. A rotating shaft 44 is disposed in telescoped relation with respect to the shaft 41 and is journalled thereon by means of a lower sleeve bearing 45 and an upper sleeve bearing 46. A thrust bearing 47 is disposed between the lower end of the shaft 44 and the mounting flange 42 to effect the supporting of the shaft 44 in a vertical direction. A suitable guard 48 is carried by the mounting flange 42 surrounding the thrust bearing 47.

The lower end of the shaft 44 is provided with a flange 49 to which there is secured a gear 50. The gear 50 is driven by means of a pinion 51 which is carried by a vertical shaft 52. The vertical shaft 52 is carried by a circular frame member 53 which is supported relative to the base frame 40 by means of a suitable housing 54. The circular frame member 53 carries a bearing member 55 in which the shaft 52 is journalled.

The base frame 40 has a depending vertical portion 56 in which there is mounted a bearing 57 which carries a horizontal shaft 58. The horizontal shaft 58 is provided with a bevel gear 60 which is meshed with a bevel gear 61 on the lower end of the shaft 52. The shaft 58 is provided with a drive pulley 62 which is driven by a drive belt 63 from an electric motor 64 (FIGURE 2). The shaft 58 is also provided with a hand wheel 65 which is disposed exteriorly of the housing 54 and which has associated therewith a seal 66 carried by the housing 54.

An intermediate portion of the shaft 44 is provided with a plurality of vertically extending equally circumferentially spaced T-bars 67 which are secured thereto by means of vertically spaced bolts 68. This is best shown in FIGURES 9A and 11. The upper portions of the T-bars 67 are provided with angle brackets 69 which are secured to the T-bars 67 by means of bolts 70. The angle brackets 69 carry a suitable guard structure 71 which extends downwardly and outwardly from the upper surfaces of the angle brackets 69. A table 72 is supported by the angle brackets 69 and is secured thereto by means of vertical bolts 73. It is to be noted that the upper portion of the guard structure 71 is clamped between the under surface of the table 72 and the angle brackets 69. The bolts 73 also serve to secure in place a turret member 74 which, as is best shown in FIGURE 11, is provided with circumferentially spaced pockets 75 for receiving the containers 29.

At this time it is pointed out that the circular frame member 53 is provided with circumferentially spaced vertically extending tubular portions 76 which have secured therein upstanding support rods 77. Intermediate portions of the support rods 77 serve to support a fence 78 which opposes the turret 74 and serve to retain the containers 29 in the pockets 75. The fence 78 is provided with suitable clamp units 80 which, as is best shown in FIGURE 11, are clamped about the rods 77.

The frame member 53 has a horizontal flange 81 which extends inwardly and which supports another ring shaped frame member 82. The frame member 82 has seated thereon a horizontal plate 83 of the housing 54. Another ring member 84 is seated on the horizontal plate 83 and the ring members 82 and 84 and the horizontal plate 83 are all secured to the horizontal flange 81 by means of bolts 85.

The ring member 84 has secured to the outer surface thereof an upstanding guard structure 86 which is telescoped within the lower portion of the guard structure 71. It is to be understood that the gear structure 86 is fixed, while the guard structure 71 rotates.

The ring member 84 has suitably secured to the inner surface thereof, as by welding 87, a sleeve 88 which, in turn, carries a pair of cooperating cam members 89 and 90 which define a cam track 91.

The lower portion of each of the T-bars 67 is provided with a slide 92 having a cross section which is best illustrated in FIGURE 12. Each slide has secured thereto a bracket 93 by means of bolts 94. The lower portion of each slide 92 is provided with a projection 95 carrying a shaft 96 on which there is mounted a cam follower 97. Thus, as the shaft 44 rotates, the slides 92, through the engagement of the cam follower 97 in the cam track 91, are vertically reciprocated for a purpose to be described hereinafter. A lower stop 79 limits the downward movement of the slides 92. At this time it is pointed out that the cam track 91 is lubricated at spaced intervals by means of grease fittings 98 which are carried by the ring member and which open into grease passages 99 which extend through the ring member 84 and the sleeve 88 into the cam track. At the same time, each slide 92 is lubricated by means of a grease fitting 100 carried by the upper portion of the associated T-bar 67. Each grease fitting 100 is associated with a grease passage 101 which is of a zig-zag shape and which eventually opens through the outer face of the T-bar 67 along that portion thereof engaged by the respective slide 92.

The table 72 is provided with a plurality of openings 102 with each opening 102 corresponding to one of the brackets 93. Each opening 102 has positioned therein a support pad 103 which is mounted on the upper end of a support shaft 104 in the manner best shown in FIGURE 10. The lower end of the support shaft 104 is secured to the respective bracket 93 by means of a bolt 105 in the manner best shown in FIGURE 9A.

Referring now to FIGURE 10 in particular, it will be seen that the guard structure 71 is provided with a sleeve 106 surrounding an intermediate portion of each support shaft 104. The upper part of each sleeve 106 is provided with a fitting 107 to which there is secured the lower end of a bellows 108. The lower portion of each support pad 103 is likewise configurated to receive the upper end of the bellows 108. Thus, the vertically reciprocating support shaft 104 is protected against dust and foreign matter.

The shaft 44 has an extension 110 telescoped over the upper end thereof. The extension 110 is fixed against rotation with respect to the shaft 44 by means of a key 111 which is seated in matching keyways in the outer surface of the shaft 44 and the inner surface of the of the extension 110. The extension 110 is vertically adjusted on the shaft 44 by means of a feed screw 112 which is threadedly engaged in an internally threaded bore 113 in the extension 110 and in an internally threaded bore 114 in the shaft 44. The screw 112 is provided with threaded end portions of opposite hands and the threads of the bores 113 and 114 are also of opposite hands and corresponds to the threads of the screw 112. Thus, when the feed screw 112 is rotated, it will move the extension 110 either up or down on the shaft 44. The feed screw 112 is provided with a non-circular cross sectional upper end 115 which may be engaged by a suitable tool. The extension 110 has a vertical passage 116 aligned with the feed screw 112 through which a suitable tool may be passed to effect the rotation of the feed screw 112.

The extension 110 includes an upper horizontal flange 117 and a depending skirt 118. The skirt 118 supports a plurality of spin welding heads, which are generally referred to by the numeral 120. Each spin welding head 120 is aligned with one of the support pads 103.

An upper housing member 121 is secured to the upper outer portion of the extension 110, and together with the horizontal flange 117, forms a chamber 122, the purpose of which is to be described hereinatfer. The housing 121 is steadied by means of a shaft 123 secured in a fitting 124 mounted at the extreme upper end of the housing 121 and at the center thereof. The shaft 123 is carried by a suitable swivel type bearing 125 which, in turn, is supported by a suitable frame member 126 which is provided in the outer ends thereof with sleeve elements 127 which receive the upper ends of the rods 77. The upper shield 128 is suitably carried by the frame member 126.

The skirt 118 is provided with a plurality of bores 130 which correspond to the positions of the spin welding heads 120. In each bore 130 there is secured a sleeve 131 which is fixed against rotation relative to the skirt 118, which skirt may be considered to be an upper turret. Each fixed sleeve 131 has secured to the lower end thereof a connector 132 which is internally and externally threaded. The connector 132 is threaded on the lower end of its respective sleeve 131 and is locked in place by means of a nut 133. A fixed housing 134 is threaded onto the lower end of the connector 132. A locating sleeve 135 is telescoped within the housing 134 and projects down below the same. The locating sleeve 135 is prevented from rotating relative to the housing 134 by means of a key member 136 carried by the housing 134 and projecting into a keyway 137 formed in the locating sleeve 135. The locating sleeve 135 is resiliently urged to a lowermost position by a spring 138 which is carried at its upper end by the lower part of the associated connector 132, and which bears against the upper end of the locating sleeve 135. The upper part of the locating sleeve 135 is provided with a downwardly facing shoulder 139 which opposes an upwardly facing shoulder 140 on the interior of the housing 134 to limit the downward movement of the locating sleeve 135 to the position shown in FIGURE 10. The lower end of the locating sleeve 135 is internally configurated, as at 141, for engaging the upper portion of the container 29.

An elongated shaft 142 extends down through the sleeve 131 and the housing 134. The shaft 142 is rotatably journalled in bearings 143 and 144 carried by the upper and lower ends, respectively, of the sleeve 131. The shaft 142 extends above the upper end of the sleeve 131 and has secured thereto a pinion 145. The lower end of the shaft 142 is provided with a closure engaging chuck 146 which is mounted on the shaft 142 for limited vertical movement. The chuck 146 is provided with a key 147 which is seated in a vertical slot 148 in the lower portion of the shaft 142 whereby the chuck 146 is continuously driven by the shaft 142 while being free to move vertically on the shaft 142.

The shaft 142 is provided below the sleeve 131 with a fitting 150 which carries a bearing 151. The bearing 151 is locked on the fitting 150 by means of a nut 152. The bearing 151 serves to support from the shaft 142 a pressure ring 153 which is in the form of an elongated sleeve surrounding the lower portion of the shaft 142 and the chuck 146 and being telescoped within the aligning sleeve 135. The bearing 151 is retained in place in the upper end of the pressure ring 153 by means of a locking ring 154.

The fitting 150 is constantly urged downwardly on shaft 142 by means of a spring 155. The spring 155 is telescoped around the lower portion of the shaft 142 and reacts against both the inut 152 and the chuck 146 to constantly urge the chuck 146 down to a lowermost position, as is shown in FIGURE 10. It is to be understood that the fitting 150 is free to slide on the shaft 142 and vertical movement of the fitting 150 permits vertical movement of the pressure ring 153 as is required in the operation of the spin welding head 120, which is to be described hereinafter.

It is to be understood that the vertical positions of the spin welding heads 120 are accomplished by means of the feed screw 112 which vertically adjusts the position of the extension 110 and which, in turn, adjusts the vertical position of the skirt or turret 118. The flange 117 has secured to the underside thereof a ring 160 which is held in place by means of bolts 161. A cylindrical guard 162 is secured to the ring 160 and depends therefrom. The table 72 is provided with an upstanding cylindrical guard 163 which is aligned with the guard 162. A circumferential flexible pleated sleeve or bellows 164 extends between the guards 162 and 163 for shielding the interior from dust or dirt.

It is necessary to constantly rotate the shafts 142 and the chucks 146 carried thereby. To this end, the horizontal flange 117 of the extension 110 has a fitting 165 secured thereto by means of bolts 166. The fitting 165 is provided with a sleeve bearing 167 in which there is rotatably journalled a stub shaft 168. The stub shaft 168 has suitably keyed to the upper end thereof a drive gear 169 which is meshed with the pinions 145 to simultaneously drive all of the shaft 142. It it to be noted that the pinions 145 and the drive gear 169 are disposed within the chamber 122 and are thereby protected from dust or dirt.

The stub shaft 168 is driven by means of a vertical shaft 170 which is provided with a splined upper end 171 which, in turn, is engaged with an internal spline arrangement of the stub shaft 168. In this manner, the stub shaft 168 may still be driven although it is vertically adjusted with the extension 110 relative to the shaft 170.

Referring once again to FIGURE 9A, it will be seen that the base frame 40 is provided in the central portion thereof with a bearing fitting 172 carries a bearing sleeve 173 in which the lower portion of the drive shaft 170 is journalled. The drive shaft 170 is provided with a collar 174 above the bearing fitting 172 and a thrust brushing 175 is disposed between the collar 174 and the upper end of the bearing fitting 172 to that of the vertical rod of the drive shaft 170.

The lower end of the drive shaft 170 is provided with a bevel gear 176 which is keyed thereon and which is secured in place thereon by means of a bolt 177. A thrust washer 178 is disposed between the bearing fitting 172 and the upper surface of the bevel gear 176.

The base frame 40 carries a sleeve 180 in which there are mounted bearings 181 which support a horizontal shaft 182. The left end of the horizontal shaft has keyed thereon a bevel gear 183 which is meshed with the bevel gear 176. A nut 184 retains the bevel gear 183 on the shaft 182. The opposite end of the horizontal shaft 182 is provided with a drive pulley 185 over which there is entrained a drive belt 186 which is driven through a motor 187 shown in FIGURE 2.

Referring once again to FIGURE 1 in particular, it will be seen that the spin welding machine 24 is provided with an in-feed turret 188 which is driven in timed relation to the feed screw 25 and the turrets of the spin welding machine 24. The in-feed turret 188 receives containers 29 from the in-feed conveyor 23 and delivers the containers into the pockets 75 of the turret 74.

The spin welding machine 24 also includes a discharge turret 189 which is also driven in timed relation to the rotation of the turret of the spin welding machine 24. The discharge turret 189 receives the containers from the turret 74 and delivers the same to a discharge conveyor 190.

Reference is now made to FIGURE 4 wherein the configuration of the cam track 91 is shown. It is to be noted that the cam track 91 includes an entrance portion 191 which immediately leads to a rise portion 192 which extends through an angle of rotation of 25 degrees. The cam track 91 then has a horizontal dwell portion 193 which extends through a 90 degree angle of rotation. Next the cam track 91 has a short fall portion 194 which extends through a 10 degree angle of rotation. Following the short fall portion 194, the cam track 91 has a horizontal dwell portion 195 which extends through an 85 degree angle of rotation. Then the cam track 91 has another fall portion 196 which extends through a 30 degree angle of rotation and which terminates in an exit end 197. The various dwell portions of the cam track 91 are all schematically shown in FIGURE 3 and it is to be noted that there is a 120 degree angle of rotation dwell between the exit end 197 and the entrance end 191 of the cam track 91.

Operation

In the operation of the apparatus 20, the containers 29 are delivered along the conveyor 22 to the in-feed conveyor 23 where the closures 33 are loosely applied thereto. The loosely assembled containers and closures are delivered to the in-feed turret 188 and then to the turret 74 where each container 29 is seated on a support pad 103. After each container 29 is seated on its respective support pad 103, the cam follower 97 associated with the support pad 103 enters into the cam track 91 and the support pad is elevated. As the support pad 103 moves upwardly, the container and closure assembly carried thereby is likewise moved upwardly with the upper portion of the container 29 first engaging the locating sleeve 135. The locating sleeve 135, being spring loaded downwardly, serves to both align the container 29 with the spin welding head 120 and to cooperate with the support pad 103 to clamp the container 29 in a fixed position with the container 29 being held against rotation.

As the support pad 103 continues to move upwardly, the spring 138 is compressed and the locating sleeve 135 is moved upwardly with the container 29. The end panel 34 of the closure 33 then engages the pressure ring 153 so that the closure 33 is pressed into tight engagement with the container 29. Next, as the support pad continues to move upwardly, the spring 155 is compressed with the pressure ring 153 moving upwardly with the container and closure assembly. As the closure 33 continues to move upwardly, a centrally located point aligning pin 198 of the chuck 146 enters the central opening 36 of the closure 33 to assure alignment of the closure 33 with the chuck 146. The chuck 146 is also provided with at least one driving pin 199 which is spaced outwardly of the centering pin 198 in accordance with the position of the openings 37. Although the chuck 146 is constantly rotating at a high speed, after the aligning pin 198 enters the central opening 36 in the closure 33, further upward movement of the closure 33, due to the upward movement of the support pad 103, results in the engagement of the drive pin 199 into one of the openings 37.

It should be understood that the foregoing description of the closure or lid 33 as being provided with openings 36 and 37 for cooperation with the chuck 146 does not mean that holes for receiving the projections on the chuck extend through the cap or lid. It is sufficient for the purpose of the present invention if the holes in the closure are merely recesses that do not perforate the lid, and it is intended that the term openings should be so construed. It is further contemplated that the closure may be provided with projections in lieu of openings or recesses for cooperation with the chuck 146, the important point being that the closure and chuck are provided with formations to provide a cooperative clutch relationship.

It is pointed out at this time that when the pressure ring 153 initially engages the closure 33, it may be rotating due to the fact that it is carried by the rotating shaft 142. However, when it engages the closure 33, it stops rotating. When the drive pin 199 of the chuck 146 enters into one of the openings 37, the closure 33 is immediately rotated with the chuck 146 and due to the engagement of the pressure ring 153 with the closure 33, it will rotate with the closure 33 and the chuck 146.

The rapid rotation of the closure 33, associated with the fact that the closure 33 is held in frictional engagement with the non-rotating container 29, results in sufficient frictional heat to be generated to effect the melting of the contacting surfaces of the plastic materials of the closure 33 and the container 29. Normally this melting will extend along the end surface 32 of the container neck and the outer surface of the collar 31 of the container neck, and along the associated portions of the end panel 34 and the skirt 35 of the closure 33.

The 90 degree dwell of the horizontal portion 193 of the cam track 91 is sufficient to obtain the necessary melting of the plastic materials of the container 29 and the closure 33. After this melting has been accomplished, it is desired to stop the rotation of the closure 33 relative to the container 29 and to hold the closure in tight contact with the container until the melted portions can bond together. Accordingly, at the end of the portion 193 of the cam track 91, the cam follower 97 enters into the short fall portion 194 and the associated support pad 103 is lowered a short distance. The distance which the support pad 103 is lowered is sufficient to disengage the closure 33 from the drive pin 199 of the chuck 146, but it not sufficient to release the pressure engagement of the pressure ring 153 with the closure 33. As soon as the closure 33 is released by the drive pin 199, it tends to stop spinning or rotating and as a result, the pressure ring 153 also stops rotating. The pressure ring now tightly holds the closure against the container so that the melted plastic material may have a chance to set and thus effect a welding of the closure 33 to the container 29 and to form the bond 38 shown in FIGURE 7. The 85 degree dwell of the cam track portion 195 is sufficient for this setting and welding of the melted plastic material. The cam follower 97 then enters into the fall portion 196 with the result that the portion 193 is lowered sufficiently to completely disengage the closure 33 and the container 29 from the spin welding head 120. The closure 33 is now effectively welded and sealed with respect to the container 29 and the assembly is transferred from the turret 74 to the discharge turret 189 for further transfer to the discharge conveyor 190.

It is to be understood that the openings 36 and 37 in the closure 33 may be temporarily sealed for shipment in any desired manner. The simplest manner is to apply a removable piece of tape (not shown) across the end panel 34 in overlying relation to the openings 36 and 37.

Although only a preferred embodiment of the invention has been specifically illustrated and described herein, it is to be understood that minor modifications may be made in the structural details and operational steps of the apparatus within the spirit and scope of the invention, as defined in the appended claims.

I claim:

1. A spin welding head for welding plastic closures to plastic containers comprising a rotating chuck particularly adapted for locking engagement with a plastic closure, a pressure ring disposed concentric with said chuck, means mounting said pressure ring for movement axially of said chuck and for freedom of rotation whereby said pressure ring may maintain pressure contact between a closure and a container both during the rotation of the closure by said chuck and immediately subsequent thereto, and a locating sleeve surrounding said chuck and contoured for engaging and aligning a container relative to said chuck.

2. The spin welding head of claim 1 wherein said chuck has drive pins for reception in openings in closures.

3. The spin welding head of claim 1 together with means mounting said chuck for resisted axial movement.

4. A spin welder for welding plastic closures to plastic containers comprising a container support, a spin welding head, and means mounting said container support and said welding head in opposed aligned relation for relative movement, said welding head comprising a rotating chuck partially adapted for locking engagement with a plastic closure, a pressure ring disposed concentric with said chuck, means mounting said pressure ring for movement axially of said chuck and for freedom of rotation whereby said pressure ring may maintain pressure contact between a closure and a container both during the rotation of the closure by said chuck and immediately subsequent thereto, and a locating sleeve surrounding said chuck and contoured for engaging and aligning a container relative to said chuck.

5. The spin welding head of claim 4 wherein said chuck has drive pins for reception in openings in closures.

6. The spin welding head of claim 4 together with means mounting said chuck for resisted axial movement.

7. The spin welder of claim 4 wherein said chuck is constantly driven and said container support is mounted for movement towards and away from said welding head.

8. A spin welder for welding plastic closures to plastic containers comprising a container support, a spin welding head, and means mounting said container support and said welding head in opposed aligned relation for relative movement, said welding head comprising a rotating chuck particularly adapted for locking engagement with a plastic closure, and a locating sleeve surrounding said chuck and contoured for engaging and aligning a container relative to said chuck.

9. An automatic spin welder for welding plastic closures to plastic containers comprising a plurality of spaced support pads, means for placing a container on each support pad, a spin welding head overlying each support pad, means mounting said support pads and said spin welding heads for movement in unison along a predetermined path and for moving each support pad and associated spin welding head relative to one another to effect the operational clamping of a container and closure therebetween along a predetermined portion of the path of movement, and means for removing welded container and closure assemblies from said support pads.

10. The welder of claim 9 wherein said mounting means are in the form of connected turrets, and said path is circular.

11. A spin welding head for welding plastic closures to plastic containers comprising a rotating chuck partially adapted for locking engagement with a plastic closure, a pressure ring disposed concentric with said chuck, and means mounting said pressure ring for movement axially of said chuck and for freedom of rotation whereby said pressure ring may maintain pressure contact between a closure and a container both during the rotation of the closure by said chuck and immediately subsequent thereto, said chuck having drive pins for reception in openings in closures, said drive pins including an elongated central aligning pin and at least one outer pin.

12. An apparatus for automatically friction welding together first and second members disposed in superimposed relation, said apparatus comprising a support for the first member and a welding head opposing said support, said welding head including a rotating chuck opposing said support and having means for driving engagement with the second member, a pressure ring resiliently urged towards said support, means mounting said pressure ring concentric around said chuck and for freedom of rotation relative to said chuck for maintaining pressure contact between the member during the friction welding thereof and immediately subsequent thereto, a sleeve surrounding said pressure ring for cooperation with said support to fixedly clamp the first member during the rotation of the second member by said chuck, and means for effecting relative axial movement of said welding head and said support.

13. An apparatus for automatically friction welding together first and second members disposed in superimposed relation, said apparatus comprising a support for the first member and a welding head opposing said support, said welding head including a rotating chuck opposing said support and having means for driving engagement with the second member, a pressure ring resiliently urged towards said support, means mounting said pressure ring concentric around said chuck and for freedom of rotation relative to said chuck for maintaining pressure contact between the member during the friction welding thereof and immediately subsequent thereto, a resiliently mounted sleeve surrounding said pressure ring for cooperation with said support to fixedly clamp the first member during the rotation of the second member by said chuck, and means for effecting axial movement of said support towards and away from said welding head.

14. The apparatus of claim 13 wherein said chuck is also resiliently mounted for limited axial movement.

15. The apparatus of claim 13 wherein said sleeve is contoured for engaging and positioning the first member.

16. A spin welding head comprising a fixed sleeve, a constantly rotating shaft journalled in said sleeve and projecting axially therebeyond, a chuck slidably mounted on a projecting end of said shaft for limited axial movement and rotationally fixed thereto, a bearing assembly slidably mounted on said shaft intermediate said chuck and said sleeve, a pressure ring carried by bearing sleeve concentric with said chuck for movement axially of said shaft and rotation independently of said shaft, first spring means between said sleeve and said bearing assembly resiliently urging said pressure ring to a projected position, and second spring means between said bearing assembly and said chuck resiliently urging said chuck to a projected position with said pressure ring projecting axially beyond said chuck.

17. The spin welding head of claim 16 together with an article positioning sleeve disposed around said pressure ring and resiliently supported in a position projecting axially beyond said pressure ring.

18. The spin welding head of claim 16 together with an article positioning sleeve disposed around said pressure ring and resiliently supported in a position projecting axially beyond said pressure ring, said article positioning sleeve being carried by a housing fixedly supported by the first mentioned sleeve.

19. A machine for automatically sealing plastic closures to plastic containers comprising a rotating turret including a table and a plurality of circumferentially spaced spin welding heads overlying said table, said table having an opening aligned with each of said spin welding heads, a support pad seated in each opening, a fixed cam underlying said table and engaged by portions of said support pads to automatically raise and lower said support pads as said turret rotates, and automatic feed and discharge means connected to said turret.

20. The machine of claim 19 wherein said feed means includes a feed screw for maintaining containers in equally spaced longitudinal alignment, and a closure dispenser overlying the path of containers being fed by said feed screw for positioning closures on the containers.

21. A machine for automatically sealing plastic closures to plastic containers comprising a rotating turret including a table and a plurality of circumferentially spaced spin welding heads overlying said table, said table having an opening aligned with each of said spin welding heads, a support pad seated in each opening, a fixed cam underlying said table and engaged by portions of said support pads to automatically raise and lower said support pads as said turret rotates, and automatic feed and discharge means connected to said turret, each spin welding head including a fixed sleeve, a constantly rotating shaft journalled in said sleeve and projecting axially therebeyond, a chuck slidably mounted on a projecting end of said shaft for limited axial movement and rotationally fixed thereto, a bearing assembly slidably mounted on said shaft intermediate said chuck and said sleeve, a pressure ring carried by bearing sleeve concentric with said chuck for movement axially of said shaft and rotation independently of said shaft, first spring means between said sleeve and said bearing assembly resiliently urging said pressure ring to a projected position, and second spring means between said bearing assembly and said chuck resiliently urging said chuck to a projected position with said pressure ring projecting axially beyond said chuck.

References Cited by the Examiner
UNITED STATES PATENTS

| | | | |
|---|---|---|---|
| 2,853,118 | 9/1958 | Schnitzins | 156—582 |
| 2,933,428 | 4/1960 | Mueller | 156—294 XR |
| 2,942,748 | 6/1960 | Anderson | 156—582 |
| 3,078,912 | 2/1963 | Hitzelberger | 156—582 |

EARL M. BERGERT, *Primary Examiner.*